(12) United States Patent
Turpin et al.

(10) Patent No.: US 7,894,419 B2
(45) Date of Patent: *Feb. 22, 2011

(54) ACTIVITY DISPLAY FOR MULTIPLE DATA CHANNELS OVER PERIOD OF TIME

(75) Inventors: John F. Turpin, Tigard, OR (US); Amy Powell, Sherwood, OR (US); Stephen D. Follett, Tigard, OR (US)

(73) Assignee: TekTronix, Inc., Beaverton, OR (US)

( * ) Notice: Subject to any disclaimer, the term of this patent is extended or adjusted under 35 U.S.C. 154(b) by 1178 days.

This patent is subject to a terminal disclaimer.

(21) Appl. No.: 11/523,116

(22) Filed: Sep. 18, 2006

(65) Prior Publication Data

US 2008/0070508 A1 Mar. 20, 2008

Related U.S. Application Data

(63) Continuation of application No. 09/935,531, filed on Aug. 22, 2001, now Pat. No. 7,109,991.

(51) Int. Cl.
*H04L 12/28* (2006.01)
(52) U.S. Cl. ........................ 370/351; 345/440
(58) Field of Classification Search ........... 455/456.2, 455/296, 423, 3.06; 370/338
See application file for complete search history.

(56) References Cited

U.S. PATENT DOCUMENTS

| | | | | |
|---|---|---|---|---|
| 5,502,576 A * | 3/1996 | Ramsay et al. | ............... | 358/444 |
| 5,644,329 A * | 7/1997 | Asari et al. | .................... | 345/89 |
| 5,689,280 A * | 11/1997 | Asari et al. | .................... | 345/89 |
| 7,061,475 B2 * | 6/2006 | Kent | ........................... | 345/177 |
| 7,088,335 B2 * | 8/2006 | Hunter et al. | ............... | 345/102 |
| 7,110,756 B2 * | 9/2006 | Diener | ....................... | 455/423 |
| 7,408,907 B2 * | 8/2008 | Diener | ....................... | 370/338 |
| 7,425,951 B2 * | 9/2008 | Fukushima et al. | ......... | 345/419 |
| 7,454,166 B2 * | 11/2008 | Patsiokas et al. | ........... | 455/3.06 |
| 2003/0025599 A1 * | 2/2003 | Monroe | ..................... | 340/531 |
| 2003/0193577 A1 * | 10/2003 | Doring et al. | .......... | 348/211.99 |
| 2005/0186933 A1 * | 8/2005 | Trans | ......................... | 455/296 |
| 2006/0025158 A1 * | 2/2006 | Leblanc et al. | ........... | 455/456.2 |

* cited by examiner

*Primary Examiner*—Thong H Vu
(74) *Attorney, Agent, or Firm*—Francis I. Gray; Michael A. Nelson

(57) ABSTRACT

An activity display for multiple data channels over a period of time for a communication link provides a quasi-three-dimensional presentation having time periods and data channels as orthogonal axes and shading within each time period/data channel rectangle representing ones density for the channel during that time period. One or more frames of the communication link corresponding to one time period are captured, and then each frame is processed in sequence one data channel at a time to build up a line of the display for the time period. Over multiple time periods the display is built up line by line, with the oldest line being dropped as a new line is added when the maximum number of lines for the display is achieved. In this way an operator has a high level all-in-one glance at the operation of the communication link.

3 Claims, 4 Drawing Sheets

ACTIVITY DISPLAY FOR MULTIPLE DATA CHANNELS OVER PERIOD OF TIME

CROSS-REFERENCE TO RELATED APPLICATIONS

This application is a continuation of U.S. patent application Ser. No. 09/935,531 titled "Activity Display for Multiple Data Channels Over Period of Time" which was filed on Aug. 22, 2001 now U.S. Pat. No. 7,109,991.

BACKGROUND

The present invention relates to wireless communication networks, and more particularly to a method of displaying activity on multiple data channels over a period of time for a communication link.

Wireless operators often need to verify correct communications between a wireless base station and a mobile switching center. Part of this verification involves sensing patterns in actual data that are carried on a communication link. Since these patterns change over time and the data patterns differ between the various data channels being carried at the same time, a convenient method of displaying channel-versus-time-versus-detected pattern is of great use as a high level all-in-one-glance troubleshooting tool.

Control and content data flowing to and from the wireless base station typically is carried on telephone carrier lines which are multi-channel pulse-code modulation (PCM) based communication links, such as T1, E1, etc. Each communication link carries a number of time slots that define the channels, such as 24 for T1, 32 for E1, etc., each of which may contain a distinct data stream. Some of the data streams are voice information from cellular telephones, while other data streams are signaling information that allows the mobile switching center and base station to communicate via one of various protocols. In some cases multiple time slots or channels are used to carry a single data stream, sometimes called a "packet pipe." Also each time slot may be routed through different paths within the telecommunication carrier network.

If the time slots are routed erroneously or the data carried in each time slot is incorrect, various problems result at the wireless base station. Certain well-known patterns in the data indicate specific problems which may be detected by viewing one or two time slots of data over a short period of time. However other patterns may require a correlation of several time slots over a more extensive period of time.

Presently the wireless operator may "view" this information one time slot or channel at a time by using a test set that displays the activity of a single time slot as a plurality of rapidly flashing lights and that also decodes the data as voice for play over a speaker. More advanced and more expensive equipment additionally may display the data over short periods of time as a series of mostly meaningless hexadecimal digits. Even more advanced equipment, such as protocol analyzers, may decode the protocol and give the user large amounts of detail about the data being carried on the communication link. In these cases the solution provides either too little or too much information of the wrong kind.

What is desired is a method of displaying activity on multiple data channels over a period of time sufficient to detect patterns in the data that are useful as a high level all-in-one-glance trouble shooting tool.

BRIEF SUMMARY

Accordingly the present invention provides a method of displaying activity on multiple data channels over a period of time for a communication link by presenting a pseudo-three-dimensional graphic display having time periods along one axis, channel numbers or time slots along the orthogonal axis, and activity in the form of one's density as a fill shade, either grey scale or color, for each rectangle defined by each time period and time slot combination. Frames for each time period are captured from the communication link and processed data channel by data channel for each frame, and frame by frame for each time period. The results are then provided to the graphic display as one "line" of the display, and the next group of frames for the next time period are captured and processed.

The objects, advantages and other novel features of the present invention are apparent from the following detailed description when read in conjunction with the appended claims and attached drawing.

DETAILED DESCRIPTION

Figure 1:
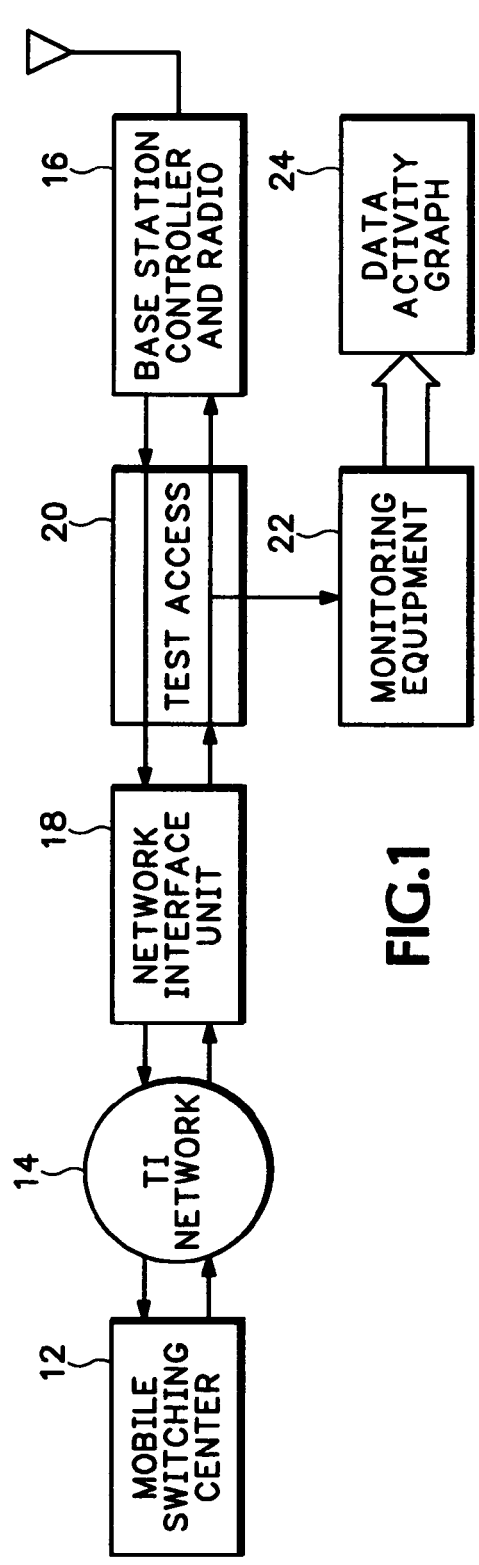
FIG. 1 is a block diagram view of a typical wireless communication system having a monitoring system in place.

Referring now to FIG. 1 a typical wireless communications system has a mobile switching center 12 that communicates over a communication link 14, such as a T1, T3, E1 link or the like, with a base station 16. A network interface unit 18 couples the communication link 14 to the base station 16. In this particular implementation a test access port 20 is coupled between the network interface unit 18 and the base station, and a monitoring device 22 is coupled to the test access port to monitor the communications from the mobile switching center 12 to the base station 16. The monitoring device 22 processes the data captured via the test access port 20 and provides a data activity graph 24.

Figure 2:
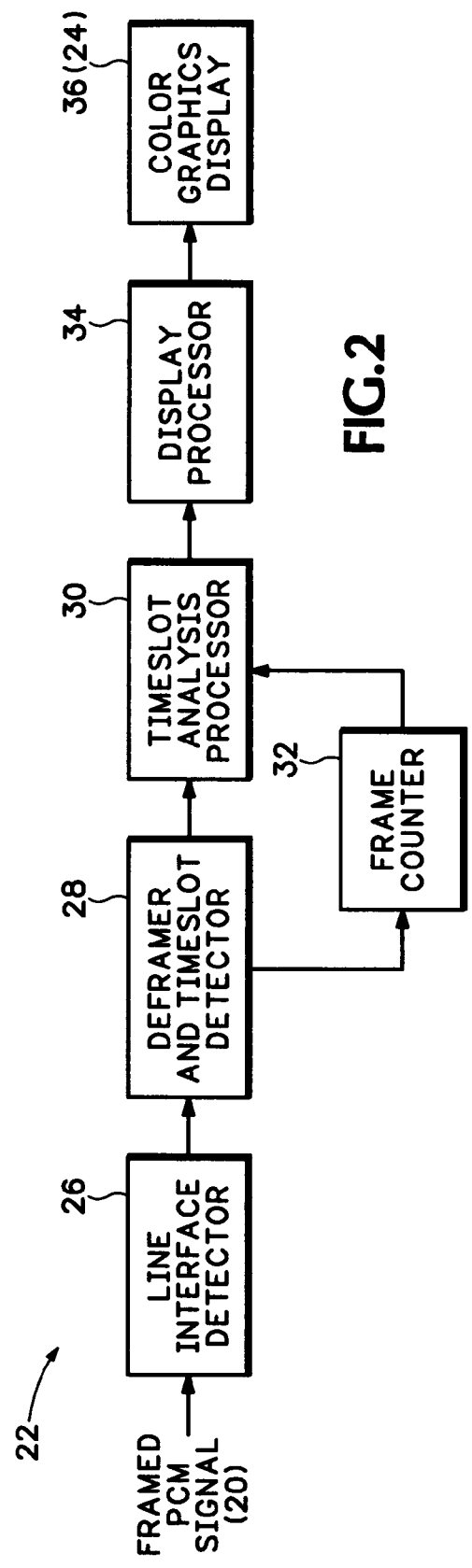
FIG. 2 is a block diagram view of a hardware architecture for displaying activity for multiple data channels over a period of time according to the present invention.

A typical monitoring device 22 is shown in FIG. 2 where a communication signal, such as a framed PCM signal, from the test access port 20 is captured by a "line" interface detector 26. The captured signal has one or more frames which are then processed by a deframer and timeslot detector 28. Each frame is processed individually by a timeslot analysis processor 30. Each detected frame is also used to increment/decrement a frame counter 32 which provides a time period input to the timeslot analysis processor 30. Output from the timeslot analysis processor 30 for each time period or line on a display, which includes one or more frames, is a one's density value for each time slot or data channel within the time period for processing by a display processor 34. The frame counter 32 may be set with a specified value that determines the time period, and each detected frame decrements the count until zero is reached, at which point the timeslot analysis processor 30 provides the output to the display processor 34. The frame counter 32 recirculates to the preset value for the next time period. Alternatively the frame counter output may be compared to a preset frame value, with the frame counter 32 being incremented for each frame and reset to zero when the preset frame value is attained, indicating the end of the time period. The output from the display processor 34 is the data activity graph 24 which appears on a graphic display device 36, such as a cathode ray tube (CRT), liquid crystal display (LCD) or the like. The timeslot analysis processor 30 may also perform other analyses of the PCM signal, such as protocol identification and analysis. Each time slot may have a different protocol, and in the case of packet pipes the protocol may extend over more than one time slot. In this case the timeslot analysis processor 30 does a correlation of known protocol headers for each time slot, or group of time slots for packet pipes, to identify the protocol of the data within that time slot or packet pipe. Once the protocol is known, further analysis may be made on the data within that time slot or packet pipe, such as determining what commands or controls are being exerted as well as determining whether the protocol is performing a proper operation.

Figure 3A:
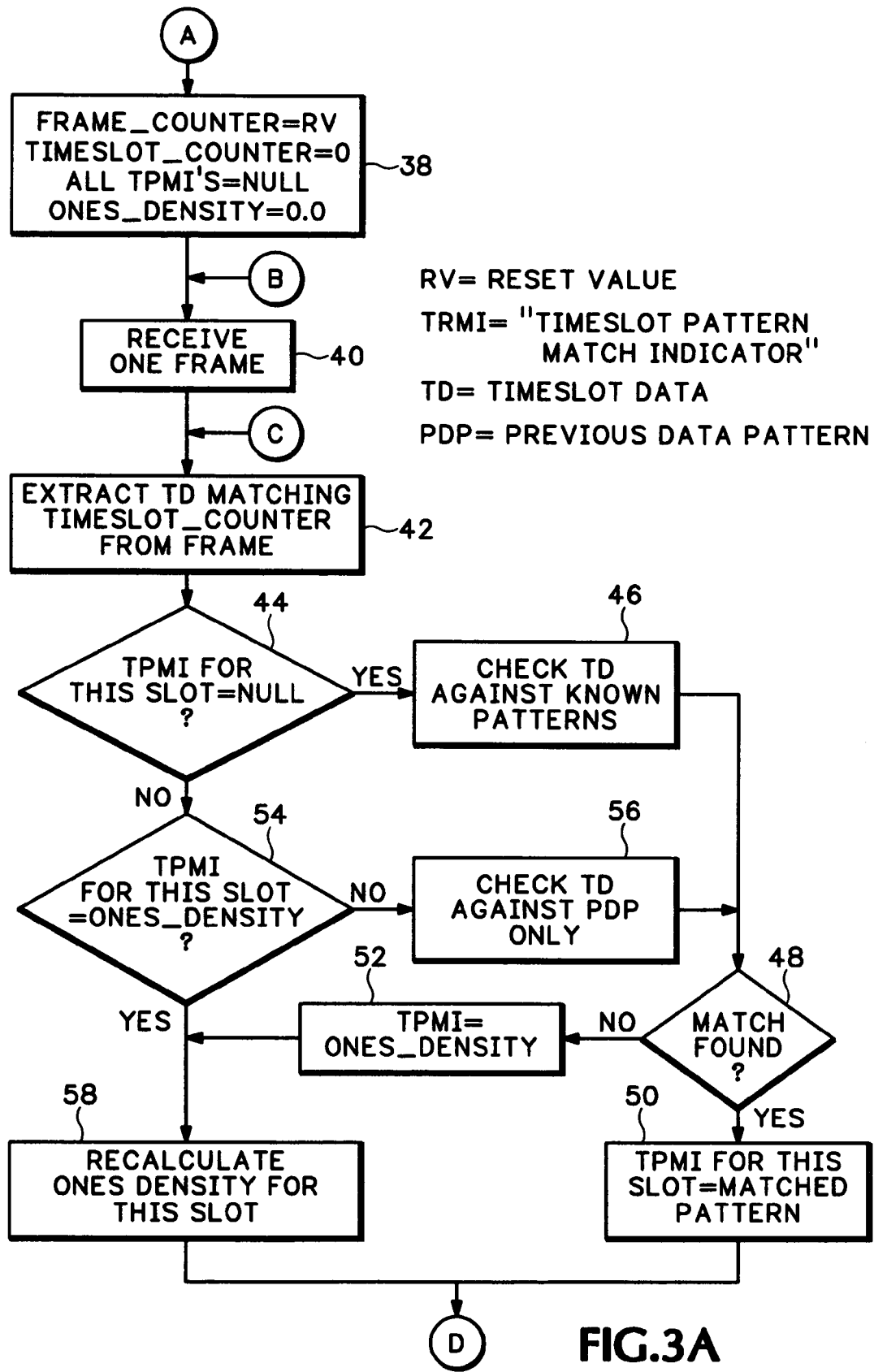
FIG. 3 is a flow chart view for displaying activity for multiple data channels over a period of time according to the present invention.
Figure 3B:
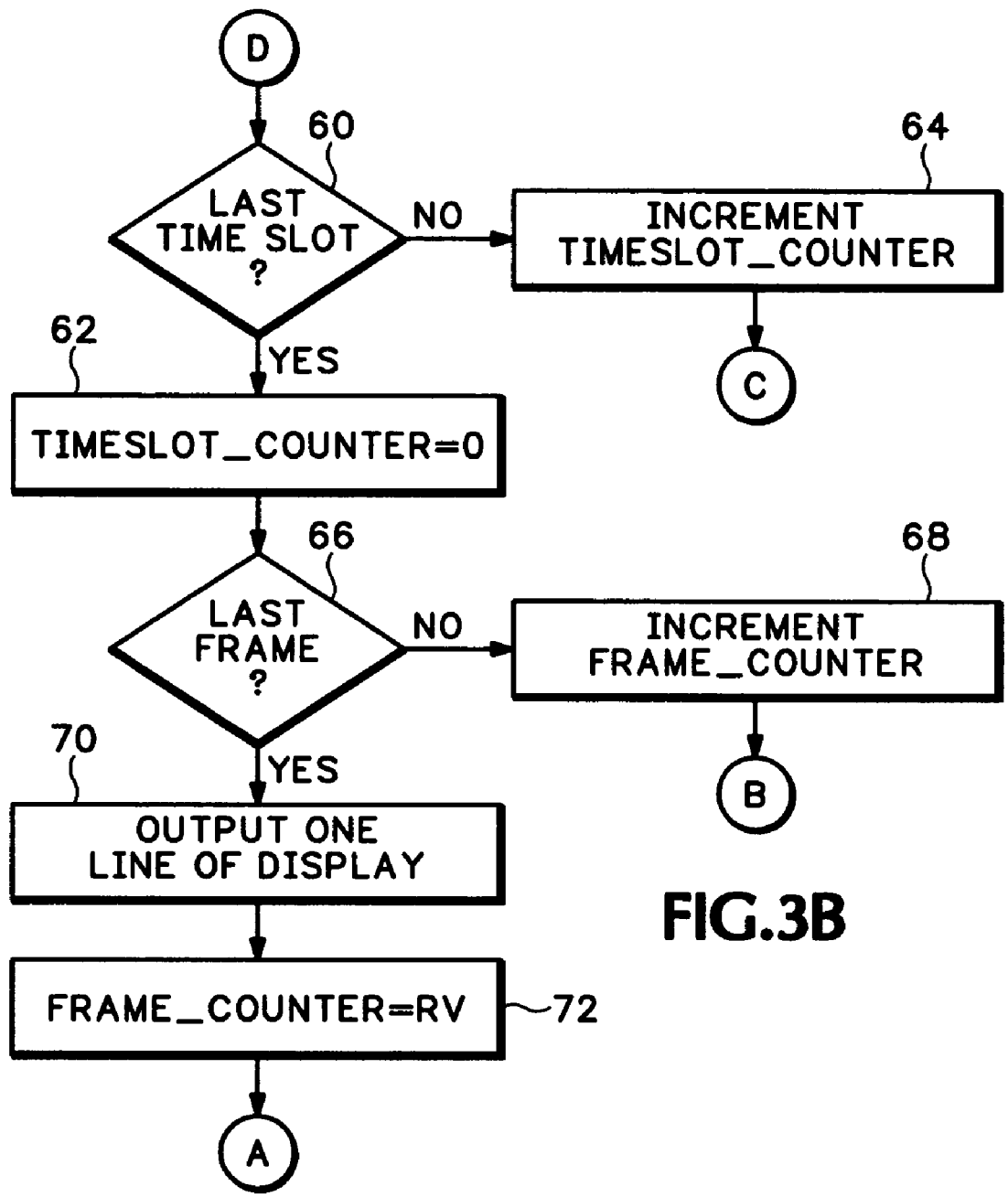

One type of analysis of the captured data is illustrated in FIGS. 3A and 3B. For each time period the method is initiated at step 38. One frame of data from the deframer and timeslot detector 28 is provided to the timeslot analysis processor 30 in step 40. The timeslot analysis processor 30 then in step 42 extracts data from the time slot within the frame corresponding to a time slot counter. Each time slot is assigned a Timeslot Pattern Match Indicator (TPMI) which is tested at step 44. If the TPMI is in its initial state=NULL, then the timeslot data is checked against known patterns in step 46. Such patterns may include all zeros, all ones, a channel idle pattern (determined by the protocol), etc. If a pattern match is found at step 48, the TPMI for the time slot is set to identify the matched pattern at step 50, otherwise it is set to indicate Ones_Density as the pattern match. If at step 44 the TPMI is not NULL, then it is tested at step 54 to see if it's set to Ones_Density. If the TPMI at step 54 is not set to Ones_Density, it is checked against a previous data pattern at step 56 and, if there is a match in step 48, TPMI is set to the matched pattern value. Otherwise from step 54 the ones density for the time slot is recalculated with prior frames of data from the time period at step 58. If the time slot data is from the last time slot of the current frame being processed as determined at step 60, the timeslot counter is reset to zero in step 62. Otherwise the timeslot counter is incremented at step 64 and the new time slot data from the current frame is processed starting at step 42. If it is the last time slot, after the timeslot counter is reset to zero a test is made to determine if it is the last frame for the time period at step 66. If not, then the frame counter 32 is incremented/decremented at step 68 and the next frame of the captured data is processed at step 40. Otherwise processing for the time period is complete and one "line" of the data activity graph 24 is output at step 70 for display on the graphics display device 36 and the frame counter 32 is reset at step 72. Processing then returns to the initialization step 38 to process newly captured data for the next time period.

Figure 4:
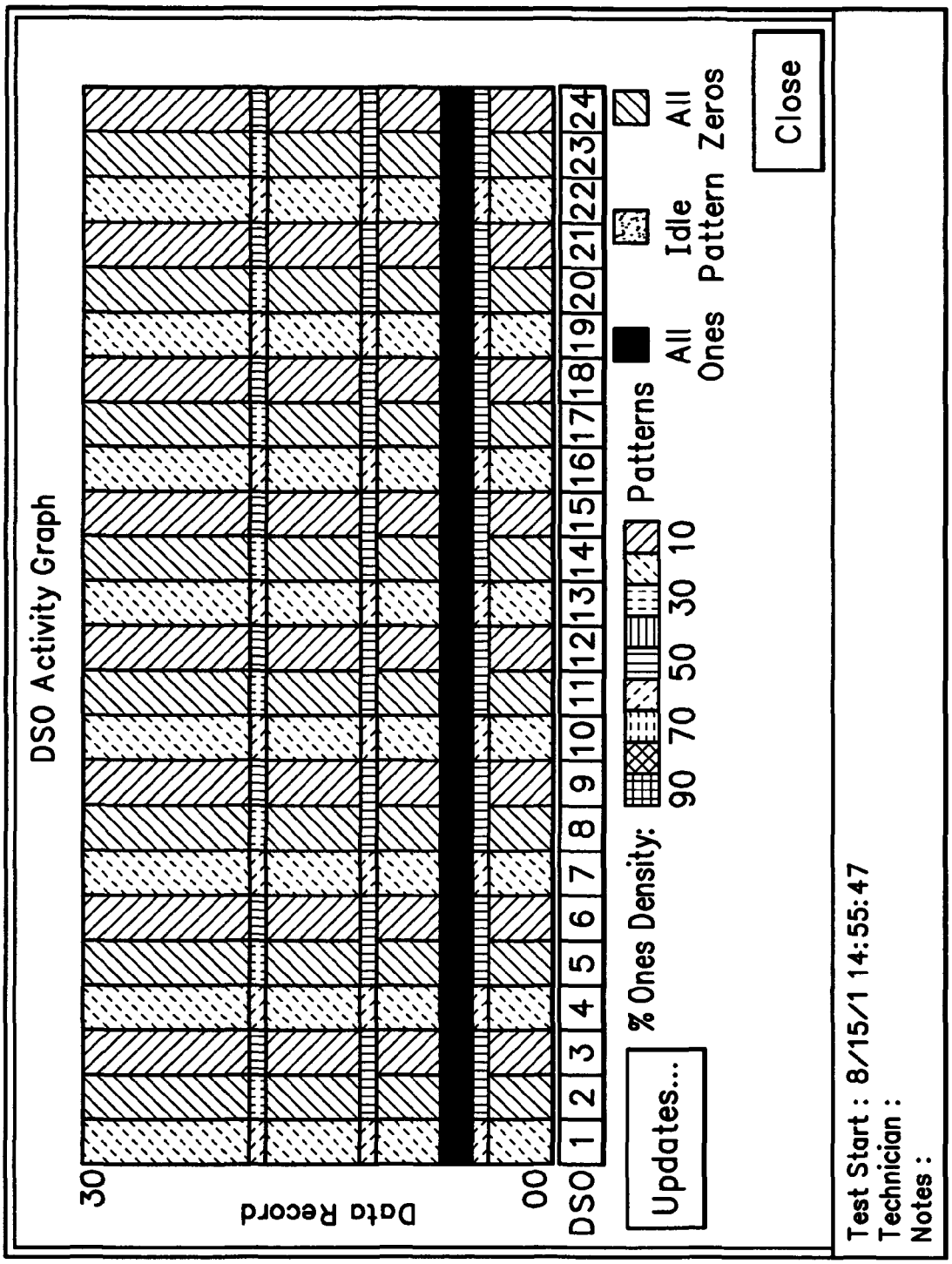
FIG. 4 is a plan view of a graphic display for showing activity for multiple data channels over a period of time according to the present invention.

The resulting data activity graph 24 is shown in FIG. 4 where the vertical axis represents data records, lines or time periods and the horizontal axis represents time slots or data channels. In this example there are 31 data records and 24 channels. The graph 24 may be shaded in grey scale levels or, preferably, in a color code where, for example, black represents an all one's pattern, grey represents an idle pattern, red represents an all zero's pattern, and percentage of one's density is represented by a range of colors not including red, such as yellow through magenta. Therefore reading the data for channel 1 vertically from the top the color scheme indicates that channel 1 had a one's density of 20 percent, then the one's density changed briefly to 60% when errors were introduce, then back to 20%, then 60% when errors were introduced again, then black when the channel was turned off briefly, etc. The particular channel selected may be indicated in some distinctive manner, such as changing the background color for the channel number, and for packet pipes all the corresponding channels that make up the packet pipe also may be indicated as selected when one channel of the packet pipe is selected.

Thus the present invention provides a data activity graph for a communication link that is quasi-three-dimensional display by plotting time period versus data channel within the communication link as orthogonal axes and indicating one's density for each such defined rectangle by a shade, either grey scale or color.

What is claimed is:

1. An activity display for multiple data channels of a communication link over a period of time comprising a quasi-three-dimensional graphics display having time periods as a first axis, data channels as a second axis orthogonal to the first axis, and a shade within each rectangle defined by the time periods and data channels corresponding to a one's density for the data in the respective data channels during the respective time periods.

2. The activity display as recited in claim 1 wherein the shade is selected from a range of grey scale values.

3. The activity display as recited in claim 1 wherein the shade is selected from a plurality of color values.

* * * * *